United States Patent
Du et al.

(10) Patent No.: US 6,847,179 B2
(45) Date of Patent: Jan. 25, 2005

(54) ACTUATOR POSITION CONTROL WITH SIGNAL SENSING

(75) Inventors: Bruce Q. Du, Apex, NC (US); Tanh M. Bui, Cary, NC (US)

(73) Assignee: Buehler Motor, Inc., Cary, NC (US)

( * ) Notice: Subject to any disclaimer, the term of this patent is extended or adjusted under 35 U.S.C. 154(b) by 0 days.

(21) Appl. No.: 10/222,971

(22) Filed: Aug. 19, 2002

(65) Prior Publication Data

US 2003/0052637 A1 Mar. 20, 2003

Related U.S. Application Data

(63) Continuation-in-part of application No. 09/923,438, filed on Aug. 8, 2001, now Pat. No. 6,437,533.

(51) Int. Cl.⁷ .............................................. G05B 11/06
(52) U.S. Cl. ........................ 318/560; 318/599; 318/626; 318/635
(58) Field of Search ............................... 318/254, 138, 318/139, 437, 721, 722, 560, 599, 626, 635, 459

(56) References Cited

U.S. PATENT DOCUMENTS

| | | | | |
|---|---|---|---|---|
| 3,346,725 A | | 10/1967 | Allured et al. ................. 235/92 |
| 3,870,937 A | * | 3/1975 | Ban ........................... 388/814 |
| 3,969,658 A | | 7/1976 | Htsui ......................... 318/202 |
| 4,788,497 A | | 11/1988 | Katsumura ................... 324/177 |
| 4,864,483 A | | 9/1989 | Divan ......................... 363/37 |
| 4,924,158 A | * | 5/1990 | Kelley et al. ................ 318/434 |
| 4,967,134 A | * | 10/1990 | Losic et al. .................. 318/802 |
| H939 H | | 7/1991 | Holland ....................... 324/166 |
| 5,111,378 A | | 5/1992 | Nowak et al. ................. 363/98 |
| 5,343,382 A | * | 8/1994 | Hale et al. .................... 363/98 |
| 5,729,067 A | | 3/1998 | Janutka ....................... 310/135 |
| 5,739,650 A | * | 4/1998 | Kimura et al. ............... 318/254 |
| 5,798,624 A | * | 8/1998 | Wilke et al. ................. 318/254 |
| 5,804,939 A | * | 9/1998 | Yamai et al. ................ 318/439 |
| 5,821,701 A | | 10/1998 | Teggatz et al. .............. 315/307 |
| 5,838,515 A | | 11/1998 | Mortazavi et al. ....... 360/78.12 |
| 5,982,571 A | | 11/1999 | Calfee et al. ................. 360/70 |
| 6,078,154 A | * | 6/2000 | Manlove et al. ............ 318/293 |
| 6,144,179 A | | 11/2000 | Kessler et al. .............. 318/565 |
| 6,150,777 A | | 11/2000 | Lander ....................... 318/245 |
| 6,208,132 B1 | | 3/2001 | Kliman et al. .............. 324/177 |

* cited by examiner

*Primary Examiner*—Rita Leykin
(74) *Attorney, Agent, or Firm*—Jacobson Holman (57) ABSTRACT

An actuator position control system for brush-type DC motors. The system includes a sensor, amplifier or differentiator, central control unit (microprocessor), and motor driver. The system utilizes the differential signal di/dt to indicate the falling edges of commutation spikes in the motor current profile. In a first embodiment, an inductor is selected as the signal sensor, because voltage drops across the inductor are directly proportional to di/dt. The voltage drop, L(di/dt), across the inductive sensor is input to the amplifier, amplified, and then sent to the microprocessor. In a second embodiment, a sensing resistor and a differentiator are substituted for the inductive sensor and amplifier, respectively. The microprocessor reads the output pulses from the amplifier or differentiator and compares the pulse count to an input command signal. The microprocessor then sends shaft position control information to the motor driver.

10 Claims, 6 Drawing Sheets

ACTUATOR POSITION CONTROL WITH SIGNAL SENSING

RELATED APPLICATIONS

This application is a continuation-in-part of U.S. application, Ser. No. 09/923,438, filed Aug. 8, 2001, which will issue on Aug. 20, 2002, as U.S. Pat. No. 6,437,533, and claims priority therefrom for the common subject matter contained herein.

BACKGROUND OF THE INVENTION

1. Field of the Invention

The present invention relates to position control systems of actuators with brush-type permanent magnet DC motors and, more particularly, to actuator position control systems utilizing commutation pulse feedback.

2. Description of the Related Art

The feedback signals of actuator position control systems are normally achieved by using encoders, resolvers, or potentiometers. More recently, commutation pulses embedded in the current of brush-type permanent magnet DC motors have been used as feedback signals (referred to as "pulse count").

Encoders and resolvers can provide good accuracy and reliability but they are too expensive for applications like HVAC control in automobiles. Potentiometers have been a popular choice for such low cost applications.

The typical arrangement for a potentiometer actuator includes a brush-type permanent magnet DC motor, and a gear train to increase the output torque. The potentiometer is driven either directly by the output shaft (wiper and carbon traces), or through another gear driven by the output gear. The output voltage as measured from the center tap of the potentiometer is then used to determine the output shaft position.

Due to the mechanical contact (wiper and carbon traces), the accuracy, stability, and reliability of such potentiometer systems is significantly compromised. In addition, the cost of such systems is still relatively high.

Pulse counting is done through monitoring of DC motor current signals. A sensor is connected to the motor power line to sense the current ripples due to commutation and, with a fixed design, the number of the ripples per shaft revolution is a constant. As a result, the motor shaft position can be determined accurately according to the pulse counting result.

Therefore, accuracy and reliability have become obstacles to development of actuator position control systems, especially for control systems in automotive applications. Accordingly, a low cost solution with a simple circuit and high system efficiency is desirable.

SUMMARY OF THE INVENTION

In view of the foregoing, one object of the present invention is to overcome the difficulties of complexity and cost found in prior art actuator position control systems.

Another object of the invention is a pulse count system for brush-type DC motors that uses inductive sensing for clean, accurate, and reliable shaft position signals to provide accurate actuator position control.

A further object of the invention is an inductive sensing actuator position control system that exhibits high system efficiency, smooth actuator operation, and insensitivity to motor life and environmental temperature change.

A still further object of the invention is a simple circuit design for actuator position control that provides a highly reliable system at low cost.

Yet another object of the invention is a pulse count system for brush-type DC motors that uses a sensing resistor with a differentiator for reliable shaft position signals to provide accurate actuator position control at minimal cost.

In accordance with these and other objects, the present invention is directed to an actuator position control system for brush-type DC motors. In a first embodiment, the system includes a signal sensor, an amplifier, a central control unit such as a microprocessor, a motor driver and a permanent magnet DC motor. An inductor is selected as the signal sensor, because voltage drops across the inductor are directly proportional to di/dt. The voltage drop, L(di/dt), across the inductive sensor is input to the amplifier. The output pulses from the amplifier are sent to the microprocessor to determine output shaft position, and speed control can also be achieved using the output pulse information.

In a second embodiment, the system includes a resistor as a signal sensor, a differentiator, a central control unit such as a microprocessor, a motor driver and a permanent magnet DC motor. Through proper selection of a capacitor within the differentiator, system performance similar to that obtained with the first embodiment may be obtained.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
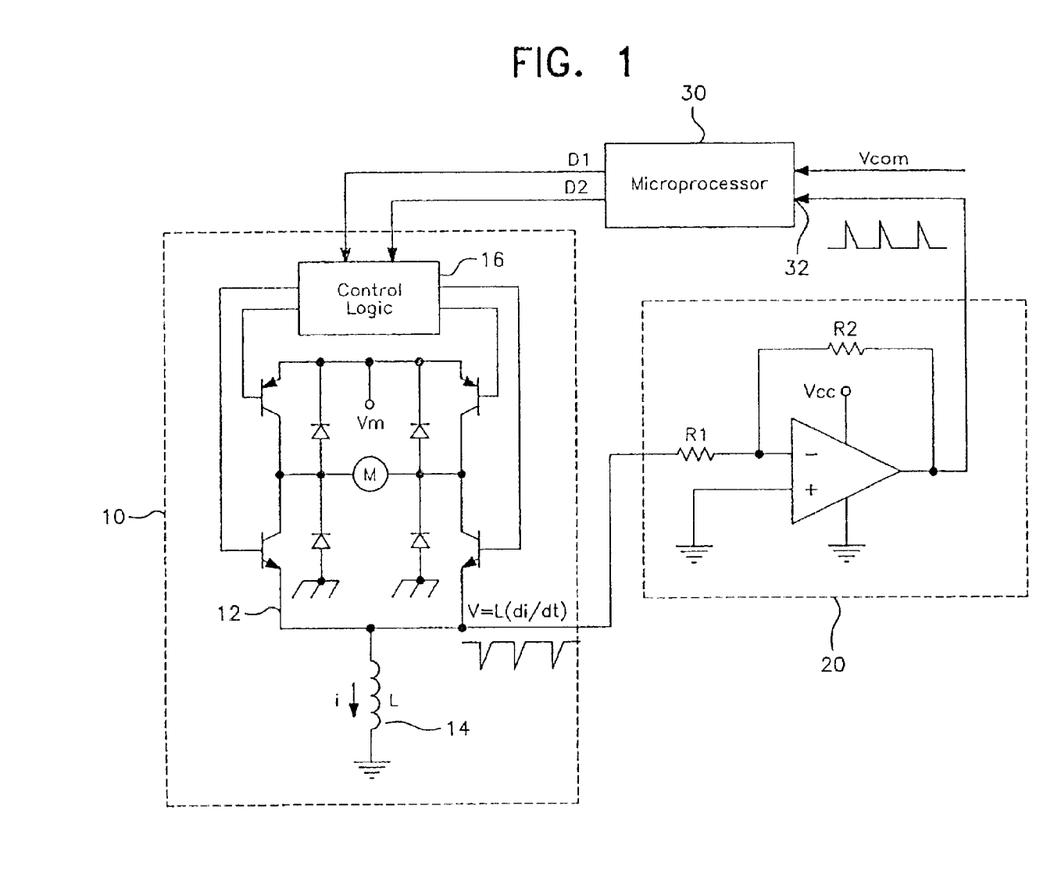
FIG. 1 is a schematic drawing of the system circuit in accordance with a first embodiment of the present invention.

A first preferred embodiment of the system of the present invention, as illustrated in the circuit diagram of FIG. 1, is based on inductive sensing. More particularly, the system operates by monitoring changes in current signals from the motor through voltage across the inductor. Voltage drops across the inductor are directly proportional to the time rate of change of the current, di/dt. The system utilizes the differential signal di/dt to amplify the falling edges of commutation spikes in the motor current profile and sense output shaft position.

As shown in FIG. 1, the system includes a motor and driver 10, an amplifier 20 and a microprocessor 30. The motor and driver 10 includes a driving circuit 12, a sensing inductor 14, and control logic 16. The sensing inductor 14 is connected in series with and senses a signal from the motor M. The sensed signal is fed to the amplifier 20. The polarity of the signal is reversed, and the magnitude of the signal is amplified, such as to 5 volts, in order for the microprocessor 30 to better read the output pulses from the amplifier 20.

Typically, there are a number of high frequency noises in the pulses due to brush bounce and other causes. The control software in the microprocessor is configured to enable the microprocessor to eliminate false readings. More particularly, the microprocessor includes a pulse reading input/output (I/O) port 32 which receives the incoming pulses from the amplifier 20. The pulse reading I/O port 32 is programmed so as to be sensitive to only the rising edges of the pulses. An interrupt service routine is triggered by the rising edge of each pulse and the pulse is counted. The I/O port 32 is then masked for most of the remainder of the pulse period to filter out noise. For a good filtering result, the masking time of the I/O port needs to be determined dynamically. In addition, the sensing inductor by nature also helps to filter electrical noises, enhancing the reliability of the system without the need for expensive filters.

Figure 2:
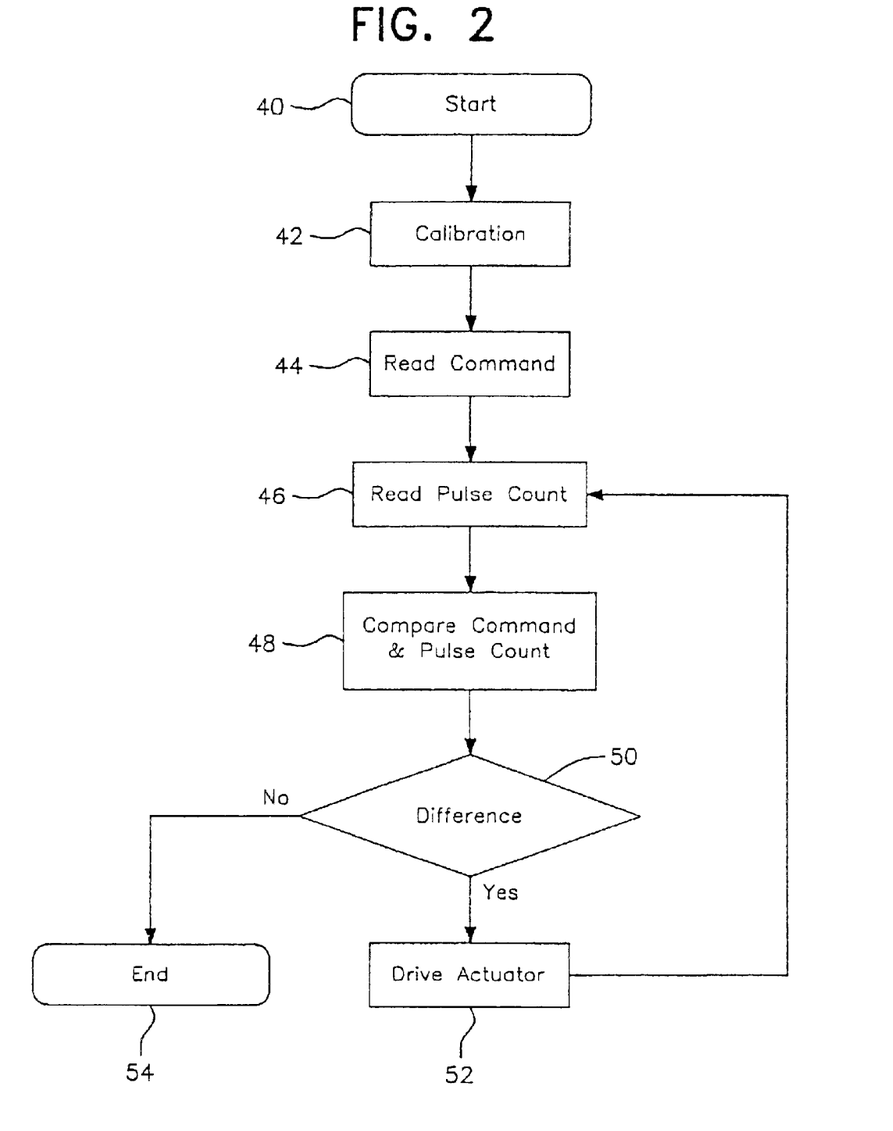
FIG. 2 is a flow chart depicting the working process of the present invention.

A command input to the microprocessor, Vcom, which is generally an analog input, triggers the control process which is summarized in FIG. 2. Upon start of the system, a calibration process 42 is initiated to determine the full range of travel of the motor (or actuator) and the current position of an associated structure being controlled, such as a door on a plenum of an HVAC system. During calibration, the number of pulses necessary to complete the full range of travel between positional limits is determined. The number of motor shaft revolutions is directly related to the number of pulses. For example, a DC motor having three coils and two poles, which represents the preferred embodiment, should have six pulses per revolution. Thus, the number of revolutions of the motor shaft necessary to complete the full range of motion from one positional limit to the other is 50, assuming the number of pulses for the full range of travel is 300. Following calibration, the system is ready to accept commands.

Upon receipt of the analog input, Vcom, triggering the control process, the microprocessor reads 44 and converts the analog command to a digital signal. The converted input is then associated with the position of the motor shaft in pulses. For example, assuming the input is 50% of the maximum input which represents the overall travel of the actuator, and the number of pulses for the full travel is 300, then the number of pulses representing the current input command is 150. The pulse count result is then read 46 and compared 48 with the digital command signal to determine the mode of the actuator. If there is a difference 50 between the pulse count and the digital command signal, driving of the actuator 52 is initiated. In the absence of a difference 50, the control process ends 54. The conversion and comparison may be accomplished in software or may be implemented using a separate analog-to-digital converter and comparator, or similar structures, as would be known by persons of skill in the art.

The actuator working modes include FORWARD, REVERSE, BRAKING and STOP. In FORWARD mode the actuator is driven in a clockwise direction; in REVERSE mode, the actuator is driven in a counter-clockwise direction. The processor 30, in response to a difference between the pulse count and the digital command signal, issues an appropriate command to the motor and driver 10 through data lines D1 and D2, in response to which the actuator (or motor M) is driven until the desired position is achieved. For example, if the digital command signal indicates a desired position at 30 revolutions and the pulse count indicates the current motor position is at 25 revolutions, the driving circuit 12 applies voltage to the motor M, drives the motor (actuator) in the appropriate direction to reduce the position difference to zero (five revolutions), and then cuts off the voltage to the motor and awaits a next command.

The control logic 16 controls which transistors are on or off, in response to the commands from the microprocessor. While software may be used, the control logic 16 is preferably embodied in hardware. The control logic may be set up to respond to the command signals received from D1 and D2 in a number of ways. For example, if D1 is logical "1" and D2 is logical "0", then FORWARD operation is indicated and source driver T1 and sink driver T2 are turned on. Conversely, if D1 is "0" while D2 is a logical "1", then REVERSE mode is indicated and source driver T3 and sink driver T4 are turned on. If both D1 and D2 are "0", then BRAKING is indicated and source drivers T1 and T3 are turned off while sink drivers T2 and T4 are turned on. Finally, if both D1 and D2 are logical "1", then STOP mode is indicated and no transistors are turned on. When so configured, other combinations would, of course, be effective. Alternatively, the microprocessor may be connected directly to the four transistors, T1, T2, T3 and T4, through four lines, with each transistor thereby responding directly to a respective command from the microprocessor.

Figure 3:
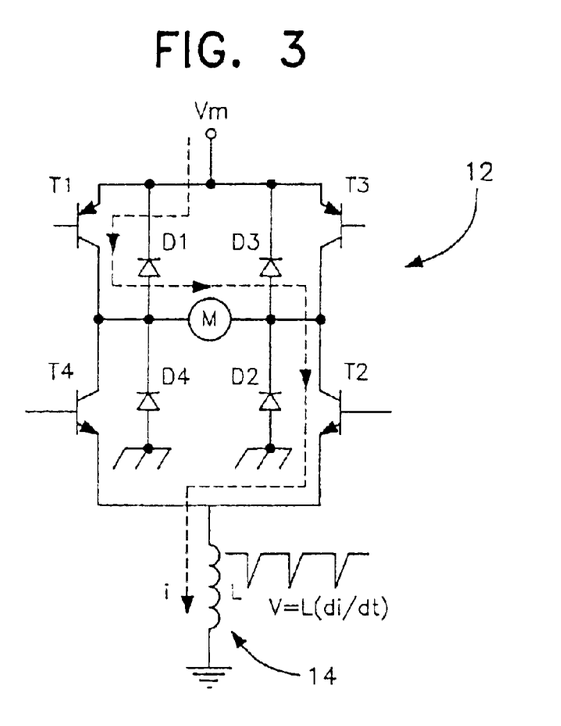
FIG. 3 is a schematic drawing of the driving circuit showing the current flow in accordance with the first embodiment shown in FIG. 1.

The motor M and driving circuit 12 is depicted in FIG. 3. The dotted line represents the current flow when source driver T1 and sink driver T2 are turned on. For FORWARD operation, the current flows along a path starting with the motor power supply, Vm, to source driver T1, to motor, to sink driver T2, and then to sensing inductor 14. For REVERSE operation, the direction of the current will change when source driver T3 and sink driver T4 are turned on and, at the same time, source driver T1 and sink driver T2 are turned off. In REVERSE operation, then, the current flows along a path from motor power supply, Vm, to source driver T3, to sink driver T4, and then to sensing inductor 14.

In BRAKING mode, the two source drivers, T1 and T3, are turned off and the two sink drivers, T2 and T4, are turned on. Depending upon the direction of current flow before braking occurs, the current will go either through a path from the motor M, to sink driver T4, to inductor 14, to diode D2 and back to motor M, or will follow a path from the motor M, to sink driver T2, to inductor 14, to diode D4, and back to motor M.

In all of the above operational modes, FORWARD, REVERSE and BRAKING, the motor current always goes through the sensing inductor 14 in the same direction. This helps to simplify the circuit and improves the reliability of the system.

Figure 4:
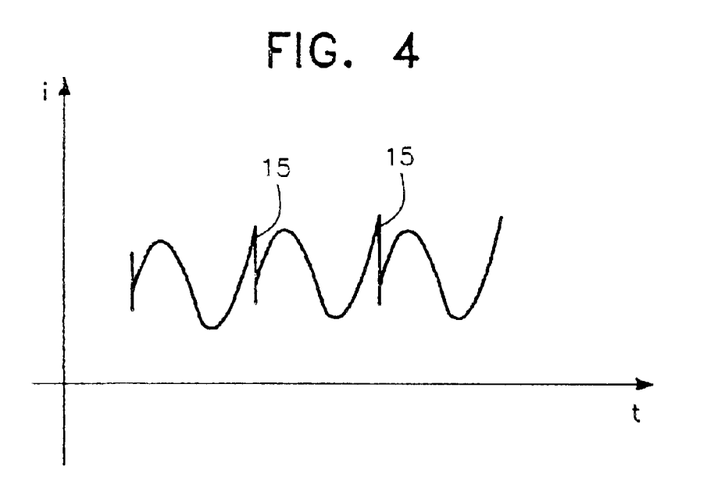
FIG. 4 is a graph illustrating the current waveform of the permanent magnet DC motor.

The current waveform of the permanent magnet DC motor is graphically depicted in FIG. 4. By Faraday's law, the voltage drop across the sensing inductor 14 is V=L(di/dt). The differentiation operation amplifies the sharp falling edges 15 of the pulses in the motor current, representatively six pulses per revolution.

The value of the sensing inductor needs to be optimized to obtain maximum system efficiency. If the value of the inductor is too small, the inductor will not be sensitive enough to current signals. On the other hand, if the value is too great, the resistance will also be too great, resulting in reduced system efficiency. In addition, it is not cost effective to use a large sensing inductor. In the preferred embodiment shown, an inductor having an inductance value of 0.47 mH is used.

Figure 5:
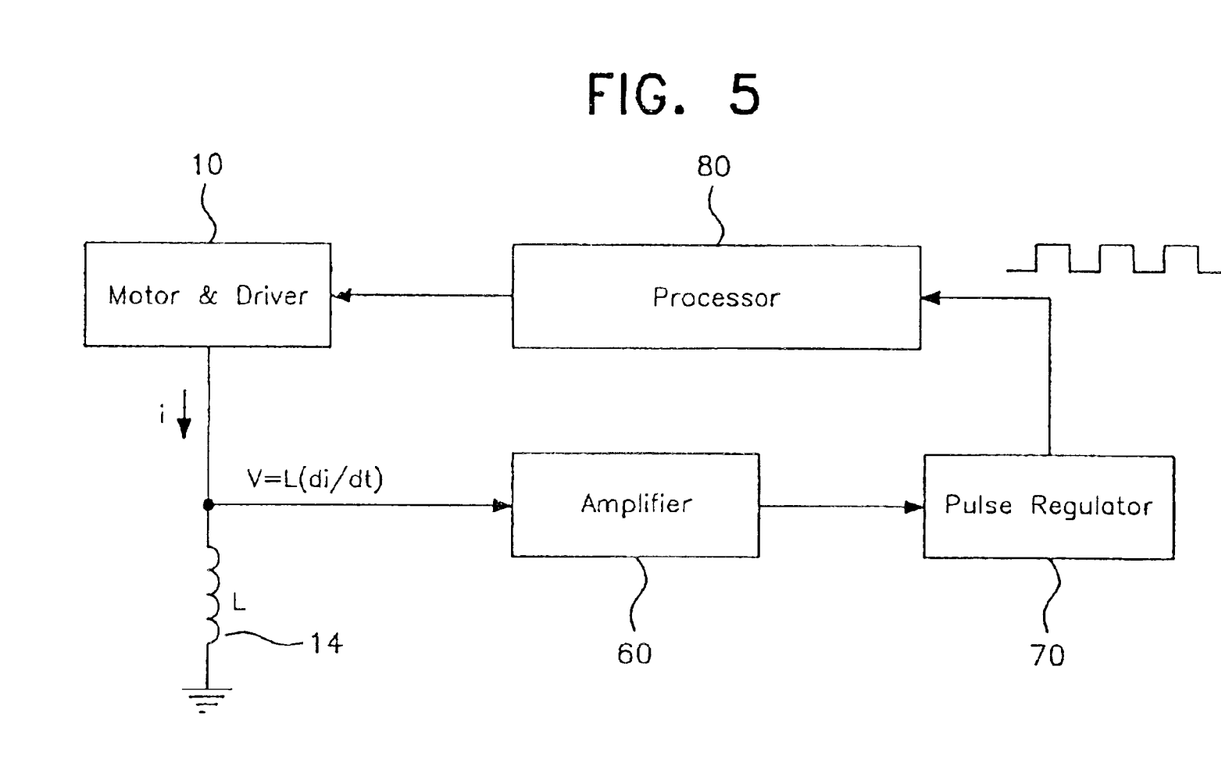
FIG. 5 is a block diagram of a variation of the first embodiment of the pulse count system of the present invention with a pulse regulator.

According to a variation of the first embodiment of the present invention, as shown in FIG. 5, the system may be embodied to include a motor and driver 10, a sensing inductor 14, an amplifier 60, a pulse regulator 70 and a processor 80. The voltage drop across the inductive sensor 14 is input to the amplifier 60. Output pulses from the amplifier 60 go through the pulse regulator 70 to trigger generation of a width-controlled square wave. The pulse regulator 70 can hold the signal until the processor is ready to proceed. The square wave pulses are then sent to the processor 80 for shaft position and speed control through the motor and driver 10. To get highly stable pulses, a pulse width control filter technique is used to filter out signal noises in the vicinity of each pulse. These noises arise, among other possible contributors, from brush bounce at the end of each commutator event.

Figure 6:
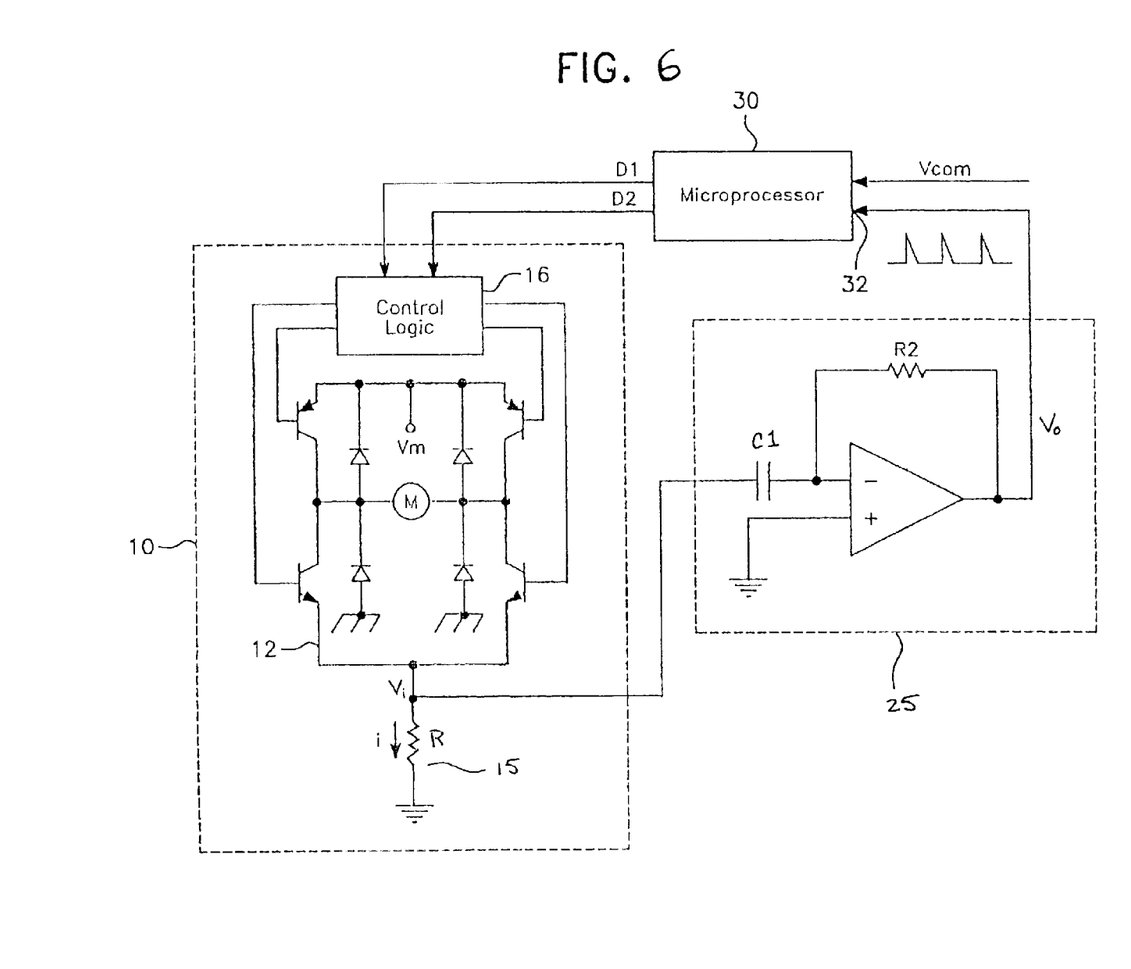
FIG. 6 is a schematic drawing of the system circuit in accordance with a second embodiment of the present invention.
Figure 7:
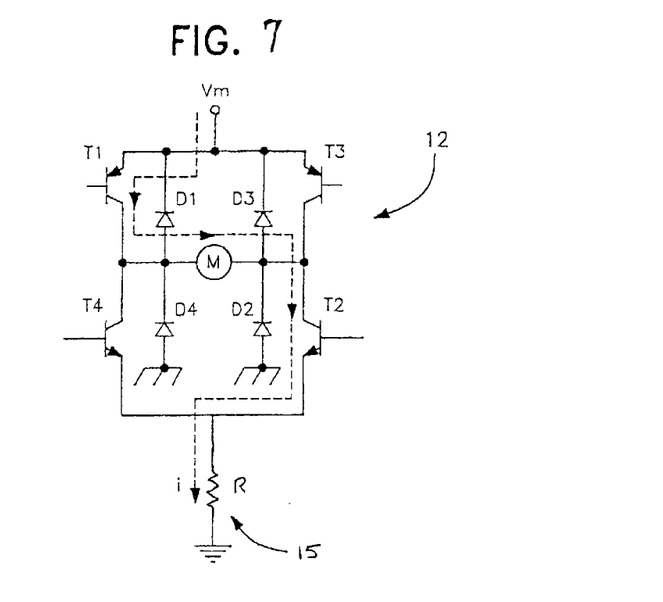
FIG. 7 is a schematic drawing of the driving circuit showing the current flow in accordance with the second embodiment shown in FIG. 6.

A second preferred embodiment of the present invention is illustrated in FIGS. 6 and 7, and discussion of elements therein which are common with the first embodiment will not be repeated. Comparable performance may be attained with the second embodiment as follows.

In the first embodiment as shown in FIG. 1, the voltage across the sense inductor 14 is amplified and then inputted to the microprocessor 30 for counting, and may be summarized, $$i \rightarrow L(di/dt) \rightarrow V_o = -(R2/R1)L(di/dt) \quad (1)$$

According to the second embodiment, a differentiator 25 may be used to achieve the same results. The relationship between $V_I$ and $V_o$ is well known for the differentiator, $$V_o = -R_2 C_1 (dV_1/dt) \quad (2)$$

By replacing the amplifier 20 of FIG. 1 with the differentiator 25 as shown in FIG. 6, if the resistor 15, R, is selected to be 1Ω, $$\rightarrow V_1 = Ri = i$$

$$\rightarrow dV_1/dt = di/dt$$

$$\rightarrow V_o = -R_2 C_1 (di/dt) \quad (3)$$

Comparing equations (1) and (3),
→$V_o$ is identical if $C_1$ is properly selected, $$C_1 = L/R_1$$

Typically, $R_1$ is in the kΩ range, and L is in the mH range, so that $C_1$ should be in the $\mu$F range and therefore economical, having a cost similar to that of the resistor $R_1$ in the amplifier 20.

Therefore, through replacement of the inductor 14 with the resistor 15, which can be a 1Ω resistor, and replacing the resistor $R_1$ and amplifier 20 with the capacitor $C_1$ and differentiator 25, system performance similar to that of the first embodiment can be obtained with the second embodiment but at a lower cost, since the resistor 15 is typically less expensive than the inductor 14.

Figure 8:
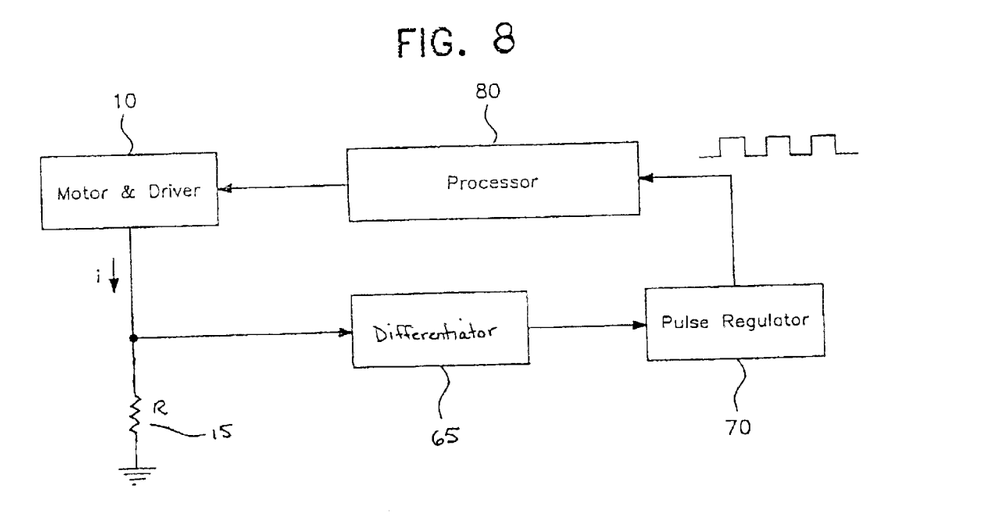
FIG. 8 is a block diagram of a variation of the second embodiment of the pulse count system of the present invention with a pulse regulator.

A variation of the second embodiment of the present invention is shown in FIG. 8. This variation operates similarly to that shown in FIG. 5, but with resistor 15 and differentiator 65 in place of the inductor 14 and amplifier 60.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A position control system for an actuator comprising:
a driving circuit coupled to a motor;
a resistor connected in series with said motor through said driving circuit, said resistor sensing a signal from said motor;
a differentiator receiving and differentiating the sensed signal, said differentiator requiring only a single amplifier, a single capacitor and a single resistor for processing of said sensed signal; and
a microprocessor receiving and counting incoming pulses from said differentiator to obtain a pulse count, said microprocessor comparing the pulse count with a command input and, responsive to a difference between said pulse count and said command input, issuing a command signal to said driving circuit to initiate driving of said actuator.

2. The system as set forth in claim 1, wherein said microprocessor is configured with input/output port and an interrupt service routine which is triggered by rising edges of said incoming pulses.

3. The system as set forth in claim 2, wherein, after a pulse count, said input/output port is masked for a remainder of an associated pulse period.

4. The system as set forth in claim 1, wherein said resistor is a 1Ω resistor.

5. A method for sensing actuator position using a sensing resistor, comprising the steps of:
monitoring changes in current signals from a motor through the sensing resistor;
receiving, by a differentiator, a sensed signal from the sensing resistor, said step of receiving by said differentiator including passing said sensed signal through only a single capacitor, and thereafter through only a single amplifier and a single resistor;
reading, by a microprocessor, incoming pulses from said differentiator;
determining a pulse count;
receiving, by said microprocessor, an actuator position command input;
comparing said pulse count with said received actuator position command input; and
driving said actuator in response to a difference between said pulse count and said command input.

6. The method as set forth in claim 5, further comprising before the step of comparing, the steps of:

calibrating the microprocessor by determining a full range of motor travel in pulses; and associating an input voltage with a motor shaft position in pulses.

7. The method as set forth in claim 5, wherein the step of determining a pulse count is triggered by rising edges of said incoming pulses at an input/output port.

8. The method as set forth in claim 7, wherein, after a pulse count, said input/output port is masked for a remainder of an associated pulse period.

9. The method as set forth in claim 8, further comprising, before the step of reading incoming pulses by the microprocessor, the step of passing pulses output from the differentiator through a pulse regulator and generating pulse-width controlled square waves for input to said microprocessor.

10. The system as set forth in claim 1, further comprising a pulse regulator between the differentiator and the microprocessor, said pulse regulator triggering generation of a width-controlled square wave for input to said microprocessor.

* * * * *